United States Patent [19]

Duckart et al.

[11] Patent Number: 4,896,535
[45] Date of Patent: Jan. 30, 1990

[54] TANK LEVEL METER

[75] Inventors: Anton Duckart, Wörth; Peter Hauler, Ettlingen; Erich Zabler, Stutensee, all of Fed. Rep. of Germany

[73] Assignee: Robert Bosch GmbH, Stuttgart, Fed. Rep. of Germany

[21] Appl. No.: 255,649

[22] Filed: Oct. 11, 1988

[30] Foreign Application Priority Data

Nov. 13, 1987 [DE] Fed. Rep. of Germany ....... 3738515

[51] Int. Cl.$^4$ .............................................. G01F 23/28
[52] U.S. Cl. .................................. 73/290 V; 181/400; 181/402; 181/0.5; 367/908
[58] Field of Search ..................... 73/290 V; 367/908; 181/0.5, 110, 123, 124, 400, 402

[56] References Cited

U.S. PATENT DOCUMENTS

| | | | |
|---|---|---|---|
| 3,010,318 | 11/1961 | Mongan | 367/908 |
| 3,884,074 | 5/1975 | Robertsson | 73/290 V |
| 4,213,337 | 7/1980 | Langdon | 73/290 V |
| 4,305,283 | 12/1981 | Redding | 367/908 |
| 4,545,245 | 10/1985 | Sharp | 73/290 V |
| 4,635,746 | 1/1987 | Lin | 181/110 |
| 4,740,726 | 4/1988 | Umezawa | 73/290 V |
| 4,765,186 | 8/1988 | Dieulesaint et al. | 181/124 |

FOREIGN PATENT DOCUMENTS

| | | | |
|---|---|---|---|
| 1037162 | 8/1958 | Fed. Rep. of Germany | ... 73/290 V |
| 2405991 | 8/1974 | Fed. Rep. of Germany | ... 73/290 V |
| 3002118 | 7/1981 | Fed. Rep. of Germany | ... 73/290 V |
| 3143515 | 5/1983 | Fed. Rep. of Germany | ... 73/290 V |
| 3330059 | 2/1985 | Fed. Rep. of Germany | ... 73/290 V |

Primary Examiner—William A. Cuchlinski, Jr.
Assistant Examiner—Diego F. F. Gutierrez
Attorney, Agent, or Firm—Michael J. Striker

[57] ABSTRACT

A tank level meter includes an elongated sound conductor of a solid material extending over the entire height of the tank and having a coating partially surrounding it. A sound generator is coupled to one end of the sound conductor to excite thereon surface waves and the opposite end of the conductor is coupled to a sound receiver. Due to different acoustic impedances of the material of the sound conductor of the fluids present in the tank that means of the air and of a liquid whose level is to be measured, the sound waves propagating at the interface of the sound conducting member and fluids arrive to the receiver with a phase shift which is proportional to the liquid level in the tank. By a suitable selection of materials of the sound conductor and coating it is possible to obtain an unambiguous measuring signal at the receiver or a measuring signal having a high resolution. By using at least two sound conductors in the tank it is possible to obtain both a single value volume reading and a high resolution.

7 Claims, 3 Drawing Sheets

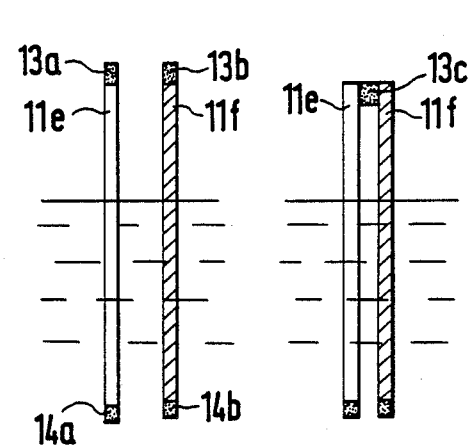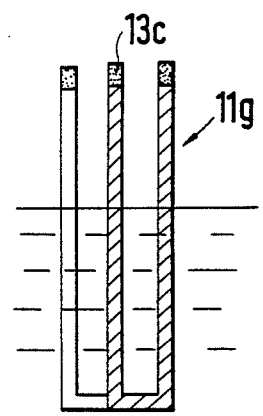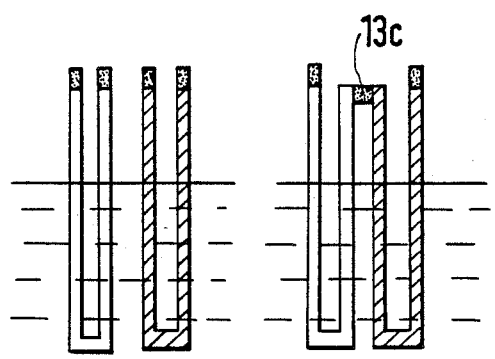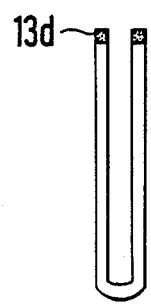

TANK LEVEL METER

BACKGROUND OF THE INVENTION

The present invention relates to a tank level meter, particularly for measuring contents of a fuel tank of a motor vehicle by means of sound waves propagating through a sound conducting member extending from the bottom to a top region of a tank. It is known to measure the liquid level and thus heads of the liquid by means of a sound receiver, a sound transmitter and a sound propagating body. However, these known measuring arrangements are based on sonic depth finding processes or reflection sounding at an interface. These known liquid level indicators however are applicable only with difficulties for fuel tanks of a motor vehicle because such tanks have normally irregular configuration. In addition, the sonar based devices are expensive and complicated in structure, detect the reflected echoes inaccurately and are susceptible to interferences.

SUMMARY OF THE INVENTION

It is therefore a general object of the present invention to overcome the aforementioned disadvantages.

More particularly, it is an object of the invention to provide an improved liquid level indicator which is reliable in operation and free from interferences.

Another object of this invention is to provide such an improved liquid level indicator which has a high resolution and measuring accuracy.

Another object of this invention is to provide an indicator which has no mechanically movable parts and which can be easily adjusted to different shapes of fuel tanks.

In keeping with these objects and others which will become apparent hereafter, one feature of the invention resides in the provision of a sound conducting member extending from the bottom to a top region of a tank, a sound generator coupled to one end and a sound receiver coupled to the opposite end of the sound conducting member, the material of the sound conducting member having an acoustic impedance which differs from that of a measured medium in the tank, the sound generator generating bending waves on the sound conducting member, and the sound receiver detecting variations of velocity of the sound propagation caused by different levels of the medium. In the preferred embodiment of the invention the material and configuration of the sound conducting member is selected with respect to acoustic impedance of a liquid to be measured such that the sound waves are received at the receiver within a predetermined phase shift whose maximum value corresponds to a full cycle of the waves.

Preferably, the sound conducting member is in the form of an elongated cylindrical bar which can be bended to match the configuration of a fuel tank. In another preferred embodiment the sound conducting member is composed of layers of materials having different acoustic impedances or different composition to obtain different sound conductivities in order to achieve the desired course of the sound conducting characteristic. It is of advantage when in the range of the so-called residual level the measuring length of the sound conducting member is extended to facilitate an accurate determination of the residual content. In another modification, there are employed two juxtaposed sound conducting rods made of different materials whereby when using ultrasonic frequency a high resolution and unambiguous measurement is achieved. The tank level indicator of this invention requires a very short measuring period determined only by the time of propagation of the sound in the sound conducting member and which is less than 1 millisecond. The solid sound conducting member is energized by a piezoelectric resonance oscillator, only a minute power is consumed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 5a through 5f illustrate different arrangements of sound conducting members for use at different frequencies.

DESCRIPTION OF THE PREFERRED EMBODIMENTS

Figure 1:
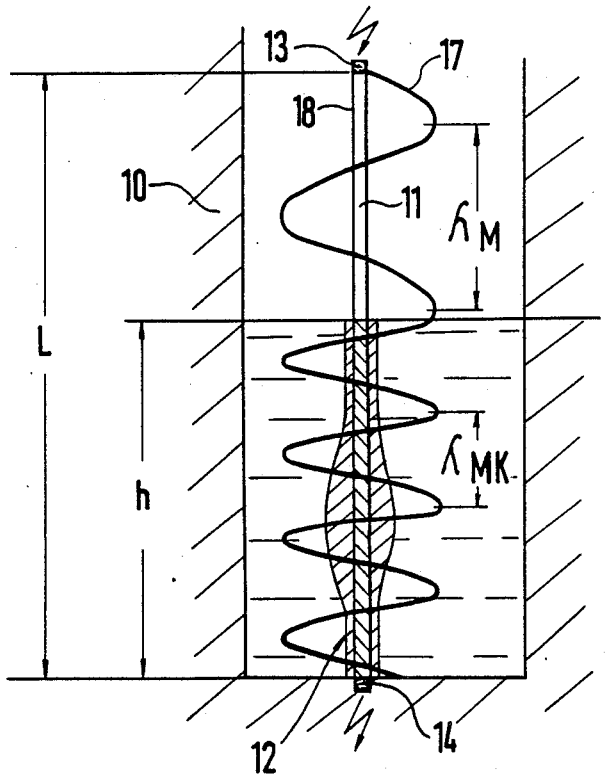
FIG. 1 is a sectional side view of an embodiment of a tank level meter of this invention.

Referring to FIG. 1, there is schematically illustrated a fuel tank 10 of a motor vehicle provided with a liquid level meter 12 which consists of an elongated sound conductor 11 extending from the bottom of the tank to a top region thereof. The upper end of the sound conducting member 11 is provided with a sound generator 13 such as, for example, a piezoelectric resonance oscillator; the lower end of the member 11 resting on the bottom of the tank 10, is coupled to a sound receiver 14. Preferably, the sound generator 13 is designed as an ultrasonic oscillator and is located above a maximum tank level L so that it is not immersed in the liquid fuel. The actual level of fuel in the tank is designated by reference character h.

Figure 2:
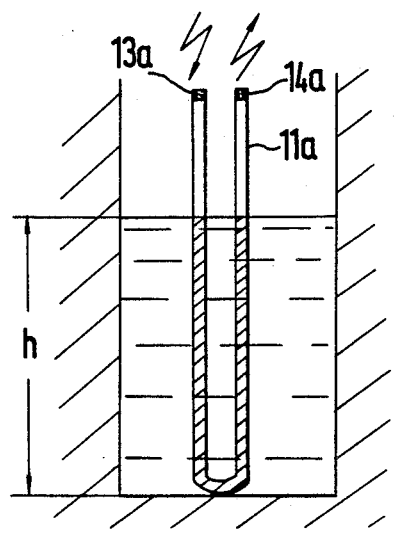
FIG. 2 shows a modification of the embodiment of FIG. 1.

FIG. 2 illustrates a modification of the tank level meter in which the sound conducting member 11a has a U-shaped configuration. Accordingly, the length of the immersed part of the sound conductor is doubled and so is the sound propagation time. In this embodiment, both the sonic generator 13a and the sonic receiver 14a are situated side-by-side above the maximum tank level and it is possible to combine both the transmitter and the receiver into a single unit. The U-shaped configuration of the sound conductor 11a can be easily adjusted to the shape of the tank.

The sound generator 13 is coupled to the sound conductor 11 such as to excite bending waves or the so-called Lamb-waves thereon. The propagation velocity of the surface waves is substantially lower in the range of the actual tank level h where the sound conductor 11 is immersed in the liquid than in the range L–h above the liquid level where the sound conductor is surrounded by air. The sound waves propagate along the interface 18 of the sound conductor with the surrounding medium. The velocity of propagation of the sound waves 17 is influenced by the size of the interface 18 and depends on the ratio of the transverse sectional area of the sound conductor 11 and its circumference. In sound conductors whose circumference is large in relation to its cross-section such as for example in the case of a rectangular cross-section, the sound propagation velocity is more than in a sound conductor having a circular cross-section. The ratio of an acoustic impedance Z of the material of the sound conductor 11 to the acoustic impedance Z' of the surrounding medium determines the change of the velocity of the sound propagation. The larger is the acoustic impedance Z of the sound conductor relative to impedance Z' of the medium the lower is the velocity of propagation in the sound conductor.

In the following table acoustic impedances Z of materials applicable for a sound conducting member of this invention and acoustic impedances Z' of surrounding media are indicated:

| Material | Z (M Pa/m/S) |
|---|---|
| Aluminum (Al) | 17.064 |
| Copper (Cu) | 41.830 |
| Steel (St 37) | 46.472 |
| Water | 1.480 |
| Plexiglass | 3.22 |
| Air | 0.00331 |
| Fuel (Super) | 0.841 |

Figure 3:
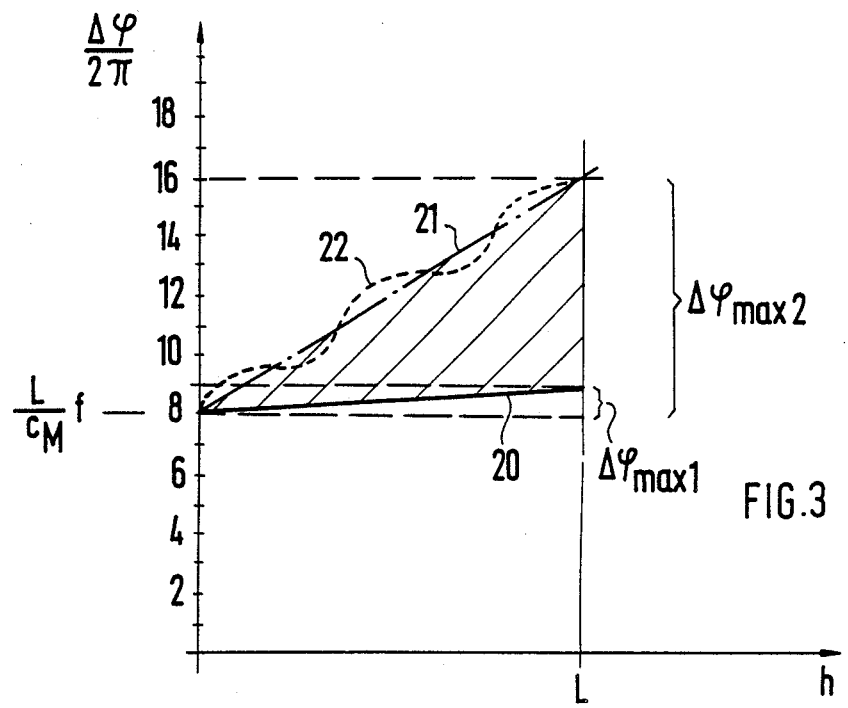
FIG. 3 is a plot diagram of the sound wave phase shift versus the height of liquid column in a tank.

$Z = c \cdot x$
wherein
c = propagation velocity of sound waves
x = specific density
Z = acoustic impedance From the above equation it is evident that when the sound conductor is surrounded by a gaseous medium for example by air the velocity of propagation of sound waves 17 remains substantially unchanged. However, when the sound waves 17 enter the range h of a liquid, such as for example water, the propagation velocity is reduced approximately by a factor of 1.5. Accordingly, the sound waves 17 transmitted by the sound generator 13 are timed delayed in the immersed portion of the sound conductor 11 that means in liquid range h as compared to that of the non-immersed portion, that means in the range L-h. Accordingly, the sound receiver 14 detects a phase shifted signal corresponding to the time delay of the sound wave 17. The phase shift is determined by the sum of two terms of which one is dependent and the other independent on the actual tank level h:

$$\Delta\phi = \left( \frac{L-h}{c_M} + \frac{h}{c_{MK}} \right) \cdot \omega$$

$$= \frac{L}{c_M} \cdot \omega + \frac{h \cdot \omega}{c_M} \cdot \frac{c_M}{c_{MK}} - 1$$

wherein
L = maximum height of the sound conductor 11 in the tank
h = actual tank level
$\Delta\phi$ = phase shift
$c_M$ = propagation velocity of sound waves in the range L-h in a medium (e.g. air) above the liquid level
$c_{MK}$ = propagation velocity of sound waves in the medium to be measured (e.g. liquid fuel)
$\omega$ = angular frequency of the sound waves The maximum shift $\phi_{max}$, that means the maximum possible phase shifting occurring between the minimum and the maximum actual liquid level H that is between h=0 and h=L, has the larger value the larger is the difference of the sound velocity at the immersed section of the sound conductor 11 and the sound velocity at the remaining section which is surrounded by air. At a maximum tank level L=about 80 centimeters, it may happen that a phase shift of several full cycles, that means of multiples of $2\pi$, takes place. As a result, an unambiguous correlation of the detected measuring signal to a certain value of the actual liquid level h would no longer be possible. FIG. 3 illustrates a corresponding course of the phase shift $\Delta\phi$ versus the actual liquid level h. The graduations of the phase shift $\Delta\phi$ are related to a full cycle $2\pi$ so that the vertical axis in the diagram of FIG. 3 indicates how many full cycle phase shifts are present. Characteristic line 20 indicates a linear course of a non-ambiguous measurement between two graduations for a full cycle of the sound wave with a maximum phase shift $\Delta\phi_{max1} = 360°$. In contrast, the characteristic line 21 indicates ambiguous or multiple value measuring results for a maximum phase shift $\Delta\phi_{max2}$ = a multiple of a full cycle. Hence, to achieve unambiguous reading of a measuring value it is possible to use a maximum phase shift $\Delta\phi_{max}$ in which a fuel cycle ($2\pi$ radians) of a wave is not exceeded. The desired uniqueness of the measuring signal in practice is difficult to achieve above a desired low frequency range. Preferably, the employed frequency f should be above the audible frequency range that means between 25 kHz and 35 kHz.

In order to obtain an unambiguous signal correlation the difference between the sound velocity $c_M$ in the sound conductor surrounded by air and the sound velocity $c_{MK}$ in the sound conductor surrounded by a medium to be measured is to be set relatively small as evident from the following formula:

$$\frac{\Delta\phi \max}{2\pi} = f \cdot \frac{L}{c_M} \left( \frac{c_M}{c_{MK}} - 1 \right) \leq 1$$

In practice, when using a frequency f = 30 kHz and a maximum tank level L = 60 cm and a sound conductor whose $c_M$ = 2260 m/s, the factor $f \times L/c_M$ is about 8 as indicated in FIG. 3.

In practice, a suitable material for the sound conducting member has proved to be copper. Particularly advantageous is a sound conductor made of a commercially available varnish copper wire of a diameter of about 1-2 mm as used for example in the manufacture of coils or transformers. As a varnish layer is used for example an impregnating varnish. In this sound conducting member the sound propagation velocity $c_M$ is determined not only by the inner copper body but also by its varnish layer. At the same time, the varnish layer dampens resonance phenomena which may occur in the core of the sound conductor 11. The latter feature is particularly advantageous because at supersonic frequencies of the sound waves, acoustic resonance may result. In other words, depending on the actual tank level and the employed excitation frequency of the sound generator the sound conductor may be brought in resonance. As a consequence the course of the phase shift would no longer be linear but would exhibit periodic fluctuations as indicated in FIG. 3 by line 22. As mentioned before, a coating of the light conductor by a synthetic material contributes to a linear phase shift caused by damping these fluctuations.

Figure 4A:
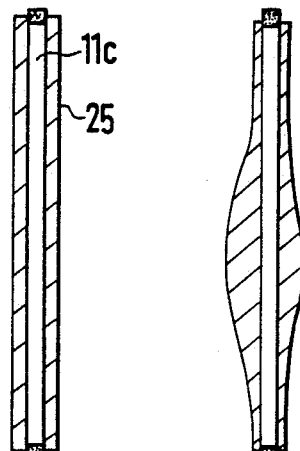
FIGS. 4a through 4d show different constructions of a sound conducting member.

In FIG. 4a there is illustrates a homogeneous coating 25 of uniform thickness provided on a sound wave conductor 11. Accordingly, the effect of the coating 25 on the sound propagation velocity $c_M$ is uniform over the entire length of the sound conductor or of its immersed portion in the range of the liquid head h. By varying the profile the cross-section, the material and the coating material of the sound conductor, the phase shift of the sound waves can be adjusted such as to achieve a one value volume measuring signal. Hence, the tank level meter 12 can be adjusted both to a particular maximum tank level L and the shape of the fuel tank.

Figure 4B:
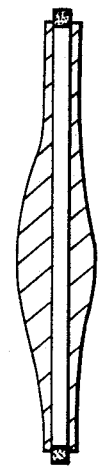
Figure 4C:
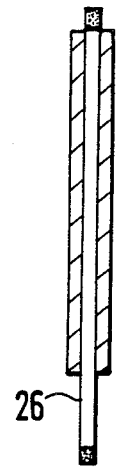

FIGS. 4b and 4c illustrate a non-homogeneous coating of variable thickness on the sound conductor. In this manner, the course of the phase shift $\Delta\phi$ can be matched to predetermined ranges of the actual liquid h. In the case of irregular tank shapes there results a non-linear relation between the actual liquid level h and a liquid volume V to be determined. The embodiments of FIGS. 4b and 4c make it possible to neutralize the effect of an irregular tank shape and to provide a linear course of the phase shift $\Delta\phi$. For example, in the range of a bulge in the fuel tank that means in the range of an increased volume relative to the remaining parts of the tank, the thickness of the coating on the sound conductor is also increased.

Due to the increased damping of the bulging coating portion the sensitivity is reduced and so is the reading of the signal at the phase shift and the course of the signal thus matches that pertaining to the smaller volume. The thinner and thicker regions of the coating of FIG. 4b thus correspond to the particular configuration of the fuel tank.

Figure 4D:
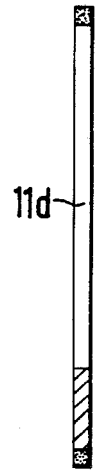

In the range of the so-called residual amount of fuel in the tank, that is the range of the fuel reserve, it is desirable to increase the sensitivity of measurement. For this purpose, the sound conductor 11c made of copper is in its region 26 corresponding to the head of the reserve fuel has no coating at all as evident from FIG. 4c. The sound conductor 11c propagates in the coated range a damped wave form whereas in the lowermost measuring range the sensitivity is enhanced. The same effect is achievable by a sound conductor 11d (FIG. 4d) which is assembled of sections of different materials. For example, the material in the lowermost section of the sound conductor corresponding to the reserve area 26 in FIG. 4c has a low wave damping property to produce a high measuring sensitivity whereas material of the remaining section is adjusted for producing a volume measuring signal. The composition of materials in the different sections can contain an arbitrary number of variations depending for example on the particular shape of the fuel tank. The combination of conductor sections of different damping quality should produce again a linear course of the phase shift similarly as in the embodiment of FIG. 4b.

For an exact measurement of the actual liquid level h it is possible to employ two or more sound conducting members 11e, 11f of different materials arranged side-by-side in a tank. In FIG. 5a, each sound conductor 11e and 11f has its own sound generator 13a or 13b and its own sound receiver 14a or 14b. Both sound generators 13a and 13b operate at different frequencies. For example, sound conductor 11e is operatively connected with a sound generator 13a oscillating at a higher frequency f1 and is adjusted to have a relatively high phase shift $\Delta\phi$ 1 without regarding to the ambiguity of the measuring signal. The other sound conductor 11f is coupled to sound generator 13b operating at a lower frequency f2 and is adjusted for a lower phase shift $\Delta\phi$ 2 resulting in an unambiguous reading of the measuring signal. The task of the sound conductor 11f is to facilitate an unambiguous correlation of the measuring signal at the other sound conductor 11e having a high resolution. The measuring signal is improved by deriving the lower frequency f2 for the unambiguous measuring signal through the coherent division of the higher frequency f1. In this manner interfering oscillation and superimposed oscillations can be eliminated.

FIG. 5b illustrates two sound conductors 11e and 11f of different materials similarly as in FIG. 5a but having a common sound generator 13c operating at a single frequency f1=f2. In the embodiment of FIG. 5c there is provided a doubled U-shaped (or W-shaped) sound conductor 11g whose outer legs are made of different materials and whose central leg is of a material of one of the outer legs. The central leg is coupled to a common sound generator 13c operating at a single frequency. The embodiments 5a and 5b can be modified such that instead of a pair of straight conductors, two separate U-shaped ground conductors can be arranged side-by-side (FIG. 5d) or combined into a single unit having a common sound generator 13c as shown in FIG. 5e.

It is also of advantage when a U-shaped or a linear sound conductor is coupled to a sound generator 13d operating at a variable frequency f. In this case the tank lever meter 12 is operated first at lower frequency f1 in order to obtain a single volume measuring signal and thereafter at a higher frequency to obtain a high resolution.

While the invention has been illustrated and described as embodied in specific examples of the tank level meter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tank level meter, particularly for measuring contents of a fuel tank of a motor vehicle and having a bottom and a top, said tank level meter comprising a sound conducting member extending from the bottom of the tank to the top of the tank; a sound generator coupled to one end of said sound conducting member to generate bending waves thereon; a sound receiver coupled to an opposite end of said sound conducting member, the material of said sound conducting member having an acoustic impedance which differs from that of a measured medium in said tank, said sound receiver detecting a measuring signal which depends on variations of velocity of sound waves propagating at an interface of said sound conducting member and surrounding media present in the tank; a coating at least partially surrounding said sound conducting member and having an acoustic impedance which differs from the acoustic impedance of said sound conducting member and is selected such that the sound waves arrive at said sound receiver with a phase shift which is substantially equal to a full cycle ($2\pi$ radians) of said sound waves to thereby achieve an unambiguous reading of the measured signal.

2. A tank level meter as defined in claim 1 wherein said sound generator operates at a ultrasonic frequency.

3. A tank level meter as defined in claim 1 wherein said sound conducting member includes portions of different materials having different sound conducting properties.

4. A tank level meter as defined in claim 1 wherein said sound conducting member is a rod-shaped solid body having an axially symmetrical configuration.

5. A tank level meter as defined in claim 4, wherein a thickness of said coating matches the shape of said tank.

6. A tank level meter as defined in claim 1 wherein said sound conducting member is a solid body having an irregular configuration matching a shape of the tank.

7. A tank level meter as defined in claim 1 wherein said sound generator operates at a variable frequency. x

* * * * *

UNITED STATES PATENT AND TRADEMARK OFFICE
CERTIFICATE OF CORRECTION

PATENT NO.   : 4,896,535

DATED        : January 30, 1990

INVENTOR(S)  : Anton Duckart, et al.

It is certified that error appears in the above-identified patent and that said Letters Patent is hereby corrected as shown below:

In the title page the name of the inventor Anton Duckart should read -- Anton Dukart --.

Signed and Sealed this

Fourth Day of December, 1990

Attest:

HARRY F. MANBECK, JR.

Attesting Officer

Commissioner of Patents and Trademarks